United States Patent [19]

Kuhn et al.

[11] Patent Number: 4,563,019
[45] Date of Patent: Jan. 7, 1986

[54] LATCH ASSEMBLY FOR HOLDING A FRONT MOUNTED IMPLEMENT IN RAISED POSITION

[75] Inventors: John B. Kuhn; Lloyd A. Wykhuis, both of Mayville; David K. Stricker, Juneau, all of Wis.

[73] Assignee: Deere & Company, Moline, Ill.

[21] Appl. No.: 564,600

[22] Filed: Dec. 22, 1983

[51] Int. Cl.$^4$ .................. B60D 3/00; A01D 35/26
[52] U.S. Cl. .................. 280/481; 56/15.9; 56/DIG. 22; 172/466; 280/490 A
[58] Field of Search .......... 280/481, 489, 490 A, 280/491 R, 491 D, 457, 460 A, 461 A; 56/6, 13.6, 15.9, DIG. 22; 172/466, 440, 441; 440/55; 403/85; 108/47, 48; 248/240; 292/95, 101, 103, 107, 121, 128

[56] References Cited

U.S. PATENT DOCUMENTS

| | | | |
|---|---|---|---|
| 2,362,407 | 11/1944 | Ruddock | 172/466 X |
| 2,712,945 | 7/1955 | Peterson | 280/457 |
| 2,867,921 | 1/1959 | Brown | 172/466 X |
| 3,902,742 | 9/1975 | Kokaly et al. | 280/481 |
| 4,413,940 | 11/1983 | Southard et al. | 280/481 X |
| 4,442,660 | 4/1984 | Kuhn | 56/15.9 |

Primary Examiner—Joseph F. Peters, Jr.
Assistant Examiner—Charles R. Watts

[57] ABSTRACT

A vehicle has a forward end portion which extends above a portion of an implement mounted to the front of the vehicle by a pair of hydraulically controlled lift arms. A latch link is connected to one and has a hook engageable with the other of the vehicle forward end portion and the implement when the implement is in a raised, inoperative position.

1 Claim, 4 Drawing Figures

LATCH ASSEMBLY FOR HOLDING A FRONT MOUNTED IMPLEMENT IN RAISED POSITION

BACKGROUND OF THE INVENTION

The present invention relates to front mounted implements and more specifically relates to an implement coupled to a vehicle by hydraulically controlled arms and a latch for securing the implement in a raised position.

It is desirable to be able to secure a front mounted implement, such as a mower for example, in a raised position so that a workman may safely position himself beneath the implement in order to service or repair it.

SUMMARY OF THE INVENTION

According to the present invention there is provided a latch for holding up an implement coupled to a vehicle by a pair of hydraulically controlled arms.

An object of the invention is to provide a simple, easy to use and releasable latch for holding a front mounted implement in a raised position.

A more specific object is to provide a latch link having a hook at one end, and which may be pivotally coupled to one, and having its hook engageable with the other, of a vehicle frame end structure and implement top structure for releasably retaining the implement in a raised position.

Another object is to provide a latch link used as set forth above and located to be highly visible so as to encourage its use.

These and other objects, features and advantages of the present invention will become apparent to those skilled in the art from the description which follows and from the drawing.

DESCRIPTION OF THE PREFERRED EMBODIMENT

Figure 1:
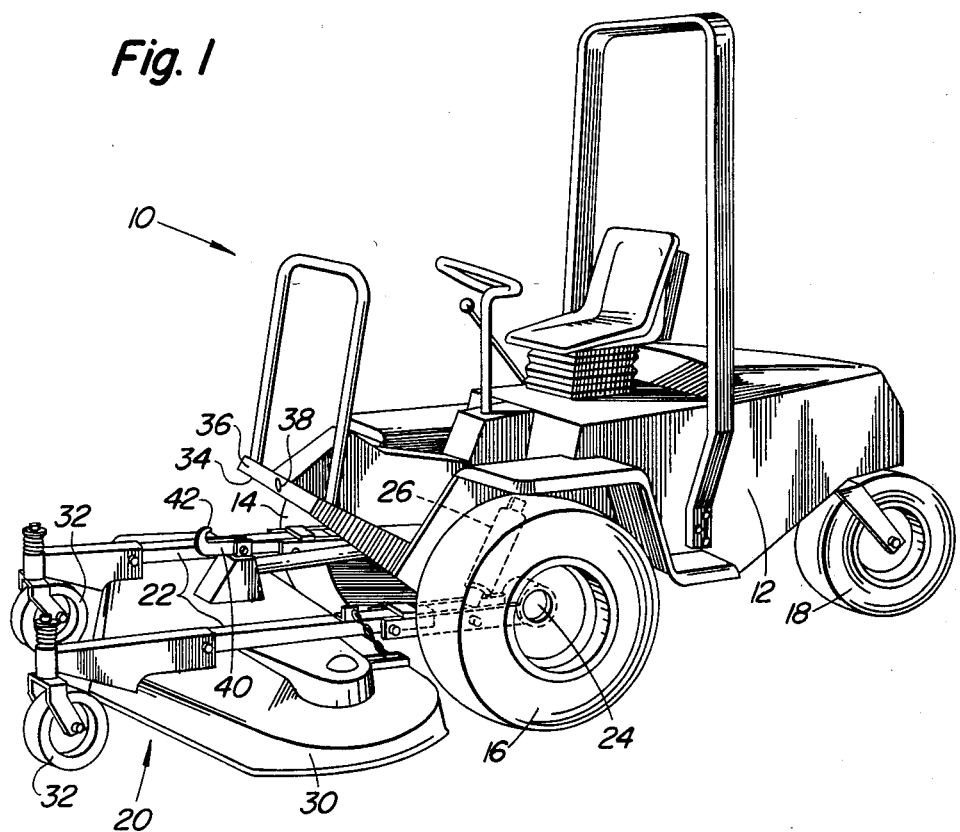
FIG. 1 is a left front perspective view of a vehicle carrying a front mounted mower with the vehicle and mower embodying a latch mechanism for selectively holding the mower in a raised position.
Figure 2:
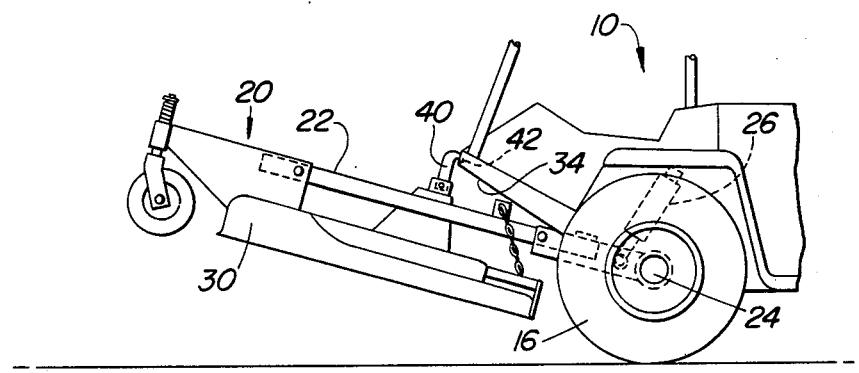
FIG. 2 is a somewhat schematic left side elevational view showing the latch mechanism of FIG. 1 in an operative condition holding up the mower.

Referring now to FIGS. 1 and 2, there is shown a vehicle 10 including a frame 12 supported on a pair of front wheels 14 and 16 and on a rear wheel 18.

A rotary lawn mower 20 is coupled to the forward end of the vehicle by means of a pair of laterally spaced lift arms 22 having their rearward ends vertically pivotally coupled to a tubular axle structure 24 of the vehicle. A pair of hydraulic lift actuators 26 (only one shown) is respectively coupled between the frame 12 and the pair of lift arms 22.

The mower 20 includes a blade housing 30 and the forward end of the arms 22 are pivotally coupled to the housing 30. Provided for supporting the forward end of the deck a desired amount above the ground when the mower is in a lowered working position, as shown in FIG. 1, is a pair of gauge wheels 32.

The frame 12 of the vehicle 10 has an upwardly and forwardly extending forward end structure 34 terminating at a transverse upright wall 36. A hole 38 is provided at a central location in the wall. A latch or hold up link 40, formed by a rigid strap, is pivotally mounted to the top of the housing 30 for swinging about a horizontal transverse axis. A hook 42 is formed in the free end of the link 40. When the mower is fully raised by the actuators 26, the link 40 may be pivoted so that the hook 42 is partially received in the hole 38 and engages the frame portion bordering the lower portion of the hole, as shown in FIG. 2. If hydraulic pressure is then removed from the actuator 26, the mower will be held in its raised position by the link 40.

Figure 3:
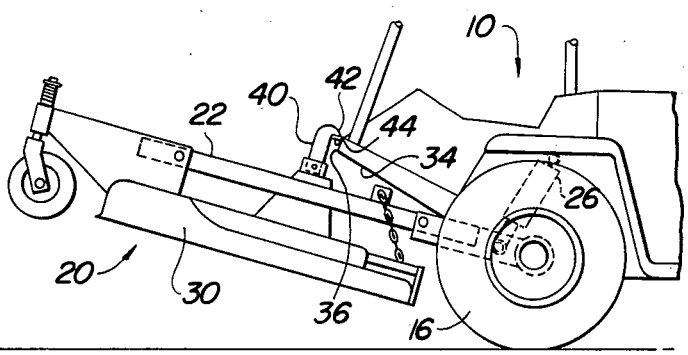
FIG. 3 is a view like FIG. 2 but showing an alternate latch mechanism.

In FIG. 3, the link hook 42 is shown engaged with a transverse bar or rod 44 welded to the wall 36 of the vehicle frame 12.

Figure 4:
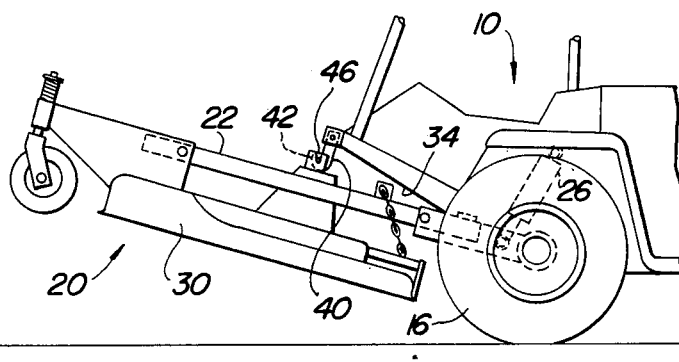
FIG. 4 is a view like FIG. 2 but showing a second alternate latch mechanism.

In FIG. 4, the link 40 is shown pivotally mounted to the wall 36 and having its hook 42 engaged with a transverse bar or rod 46 fixed to the mower housing 30.

The foregoing is thought to clearly set forth the operation. Suffice it to say that the latch link 40 provides a highly visible, simple and effective way to hold up the mower housing 30 so that a worker may safely place himself under the housing so as to service, repair or replace components such as blades and spindles which are accessible only from beneath the housing.

We claim:

1. In a vehicle having an implement mounted to the forward end thereof by a pair of hitch arms hydraulically controlled for movement between raised and lowered positions with said vehicle having a forward end structure extending above said implement and defining an upright, transverse wall, the improvement comprising: a hold-up link, in the form of a rigid strap, pivotally mounted to a top structure of the implement for swinging about a horizontal transverse axis; said hold-up link having a hook provided at a free end thereof and hook engaging means in the form of a hole being provided in said wall for selectively releasably receiving said hook when the hitch arms are raised whereby the implement may be selectively retained in its raised position without need of hydraulic power.

* * * * *